INVENTOR.
CECIL K. STEDMAN
BY
ATTORNEY

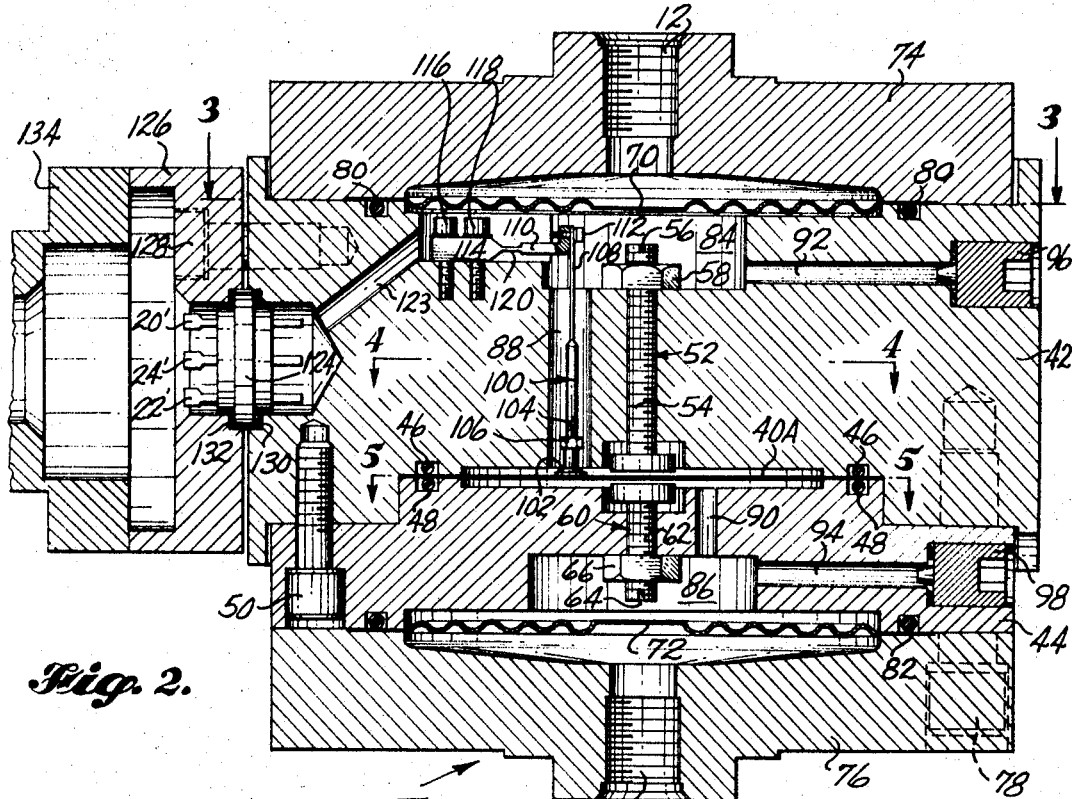
Fig. 2.
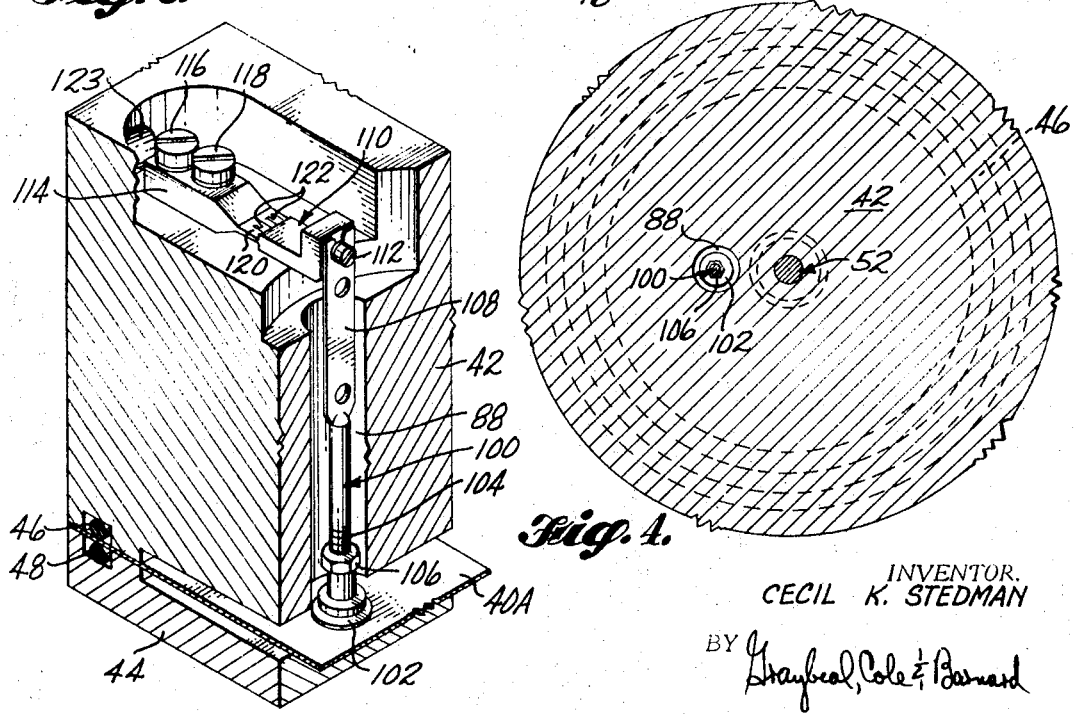
Fig. 6.
Fig. 4.
INVENTOR.
CECIL K. STEDMAN
BY Graybeal, Cole & Barnard
ATTORNEYS

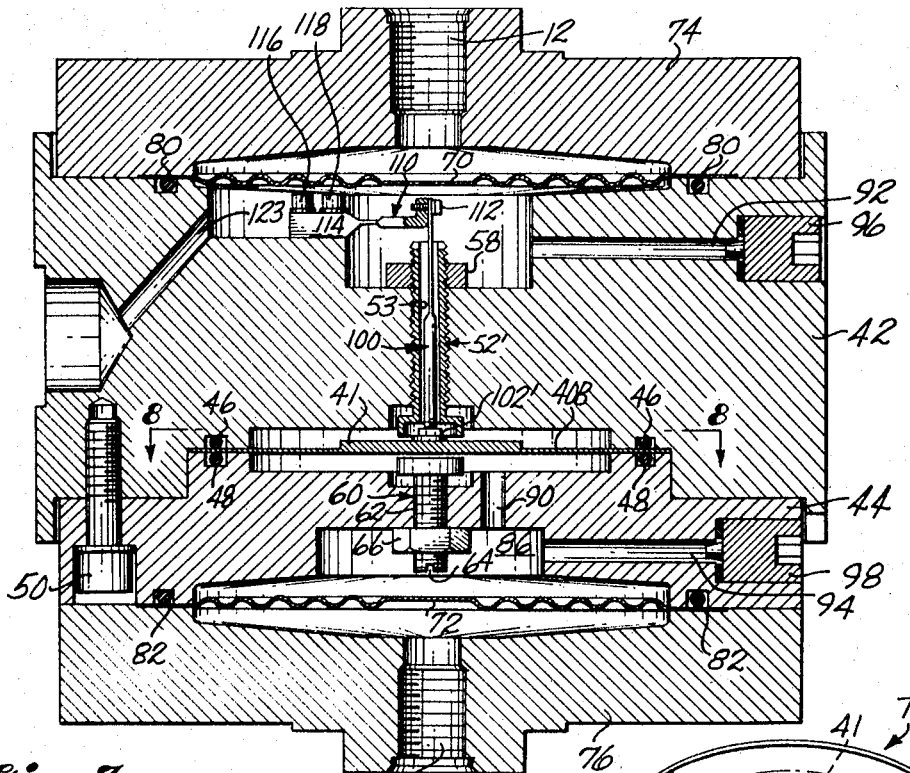
Fig. 7.
Fig. 9.
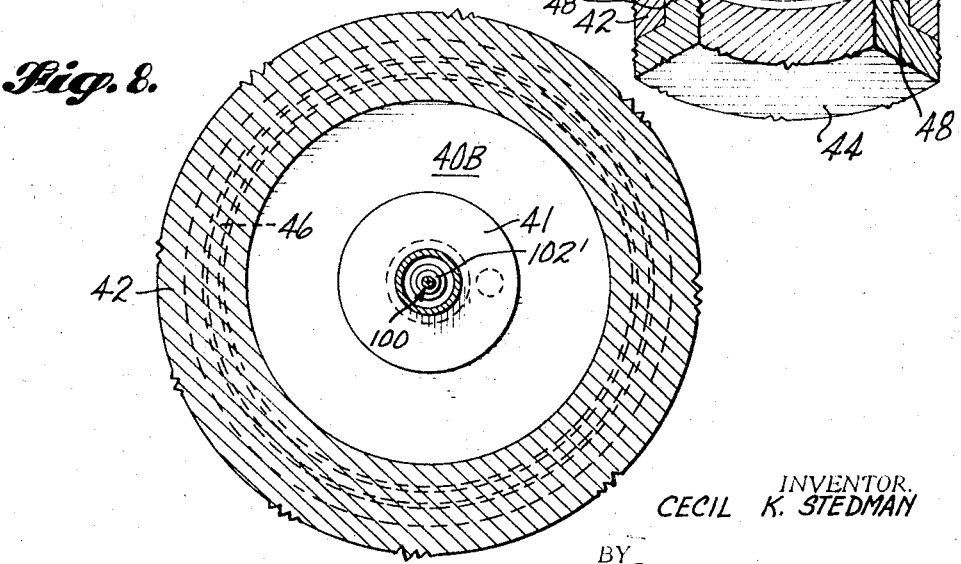
Fig. 8.
INVENTOR.
CECIL K. STEDMAN
BY Graybeal, Cole & Barnard
ATTORNEYS May 20, 1969  C. K. STEDMAN  3,444,736
SQUARE ROOT RESPONSIVE PRESSURE TRANSDUCERS
Filed July 22, 1966  Sheet 4 of 6

INVENTOR.
CECIL K. STEDMAN
BY Graybeal, Cole & Barnard
ATTORNEYS

United States Patent Office

3,444,736
Patented May 20, 1969

3,444,736
SQUARE ROOT RESPONSIVE PRESSURE
TRANSDUCERS
Cecil K. Stedman, Enumclaw, Wash., assignor to Statham
Instruments, Inc., Los Angeles, Calif., a corporation of
California
Filed July 22, 1966, Ser. No. 567,291
Int. Cl. G01f 1/00
U.S. Cl. 73—205                                           15 Claims

ABSTRACT OF THE DISCLOSURE

Square root responsive pressure transducers developing a signal output proportional to the square root of the applied pressure differential, and combinations thereof with a venturi tube, pitot tube or the like, wherein the signal output provides a linear indication of the fluid flow rate through or past the tube. Accurate flow rate indication over a wide range (e.g. from 3 to at least 30 p.s.i.d) is achieved.

---

The present invention relates to fluid pressure responsive devices wherein the response to differential pressure is nonlinear over a relatively wide loading range, and more particularly to such devices wherein the response is proportional to the square root of the pressure differential over a range of pressure differential of at least about 3:1.

Pressure transducers according to the invention are characteristically capable of providing a signal output proportional to the square root of the applied pressure differential, and can be utilized to linearly indicate flow rate of a fluid through a venturi tube or the like, or flow rate of a fluid past a pitot tube, for example.

The pressure drop across the venturi under conditions of turbulent flow, or the stagnation pressure in a pitot tube, are proportional to the square of the velocity of fluid flow. Linearly responsive pressure transducers have been used in conjunction with meter or like indicating devices having nonlinear scales to provide a direct indication of velocity or rate of fluid flow. These devices are relatively insensitive at relatively small flow rate values, as illustrated by the circumstance that present commercially available linear meters, with scales graduated to read fluid flow rate directly, involve a meter deflection of only about 11% of full scale when the flow rate is one-third of the full scale value, for example.

It is a basic object, advantage and feature of the present invention to provide a variety of forms of pressure responsive devices, and to provide the design parameters therefor, which are square root responsive to change in differential pressure and which give accurate square root responsive indication over a range of flow rates of at least about 3:1, e.g. throughout a differential pressure loading range from 3 p.s.i.d. (pounds per square inch pressure differential), to at least about 30 p.s.i.d., for example. To achieve this operating characteristic, I have found that a clamped diaphragm (with or without a central boss) can be used as the load sensing instrumentality, providing the diaphragm is designed to have limit of elasticity which is not exceeded throughout the desired loading range of the transducer, and can undergo load pressure responsive deflection to an extent substantially exceeding the thickness of the diaphragm within the limit of elasticity of the diaphragm. This order of elasticity, and extent of loading within the limit of elasticity, are to be contrasted with the design parameters of a conventional linearly responsive clamped diaphragm, wherein the limit of elasticity of the diaphragm is reached when the diaphragm is deflected only a small fraction (e.g. one-third or at most one-half) of the diaphragm thickness. The relationship between the thickness of a diaphragm and its deflection can conveniently be expressed in terms of a parameter $q$ defined by the formula $$q = \frac{p}{E} \frac{a^4}{h^4}$$

inasmuch as any flat clamped plate diaphragm will necessarily deflect at the center a distance equal to its thickness when loaded in such a way that $q=9.0$. If $q$ is greater than 9.0 it will deflect more than its own thickness; if $q$ is less than 9.0 it will deflect less than its own thickness. It is an essential feature of this invention that the diaphragm be so designed that its limit of elasticity will not be exceeded unless $q$ is substantially greater than 9.0, for example about 30, whereas in conventional instruments utilizing linearly responsive diaphragms the limit of elasticity will typicaly be exceeded when $q$ reaches a value substantially less than 9.0, for example about 3. If the diaphragm in question has a boss, a larger value of $q$ is required for deflection equal to the thickness. For example if the boss radius is half the diaphragm radius the required value of $q$ is 41. Consequently in an instrument designed according to this invention and using such a boss, the limit of elasticity will not be exceeded provided $q$ is less than about 60, whereas in a linear instrument using such a boss the limit of elasticity will typically be exceeded when $q$ is substantially less than 41, for example about 8, as more fully discussed and illustrated at Table 6 of my copending U.S. Patent No. 3,341,794, issued Sept. 12, 1967.

Other objects of the invention include the provision of various forms of square root responsive transducer assemblies which are variously adapted to particular applications, such as use of a clamped flat diaphragm mechanically coupled to deflection sensing mechanism including a relatively limber cantilever beam which mounts a plurality of strain gages, with the clamped diaphragm isolated from the load applying fluid by relatively limber isolation diaphragms (such as shown and discussed below in connection with FIG. 2–6); a transducer assembly involving a clamped, load sensing diaphragm with a central boss, which is mechanically linked to a relatively limber deflection sensing mechanism cantilever type beam carrying a plurality of strain gages, with the load sensing diaphragm isolated from the pressure applying fluid by relatively limber isolation diaphragms (such as shown in FIGS. 7 and 8); a transducer assembly involving a boss type load sensing diaphragm with deflection sensing strain gage means bonded directly to the diaphragm rather than being mechanically linked to a cantilever beam on which the strain gages are located (such as shown in FIG. 9); and a transducer assembly wherein clamped flat load sensing diaphragms are arranged to also serve as isolation diaphragm means and are in direct contact with the load applying fluid, with volumetric displacement sensing means including a relatively limber diaphragm of corrugated configuration or the like being arranged between the load sensing diaphragm and mechanically coupled to a cantilever beam on which a plurality of strain gages is mounted (such as shown in FIGS. 10 and 11).

These and other inherent objects, advantages, features and characteristics of the invention will be apparent from the following detailed discussion of certain typical forms of the invention, and the following discussion of certain of the design considerations pertaining to manufacture of such transducer assemblies, which discussions make reference to the accompanying illustrations, wherein like letters and numerals refer to like parts, and wherein:

FIG. 2 is a view in axial cross section of a typical square root responsive transducer assembly according to the present invention, involving a clamped flat diaphragm mechanically coupled to a cantilever beam bearing strain gage means, and isolated from the load applying fluid by two relatively limber isolation diaphragms;

FIG. 4 is a fragmentary cross-sectional view taken substantially along line 4—4 of FIG. 2;

FIG. 6 is an isometric cutaway view further showing the constructional detail of the form of transducer assembly illustrated at FIGS. 2–5;

FIG. 7 is a view in axial cross section of a modified form of transducer assembly according to the present invention, wherein the load sensing diaphragm is of the boss type and is centrally connected to a cantilever beam mounting a plurality of strain gages, with relatively limber isolation diaphragms enclosing the chamber in which the load sensing diaphragm operates;

FIG. 8 is a fragmentary cross-sectional view taken substantially along line 8—8 of FIG. 7;

Figure 10:
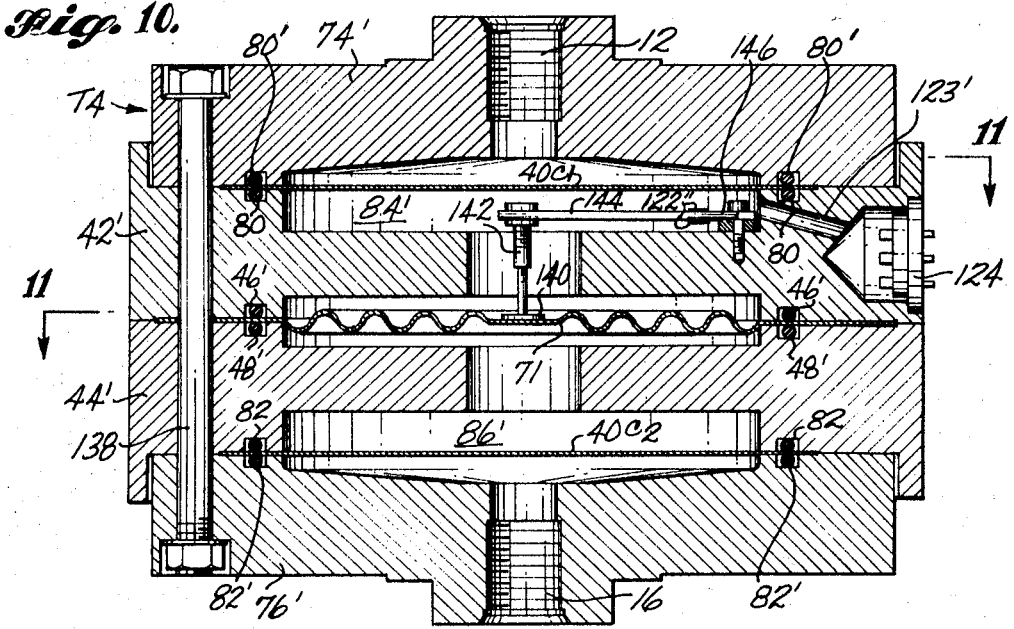
Figure 11:
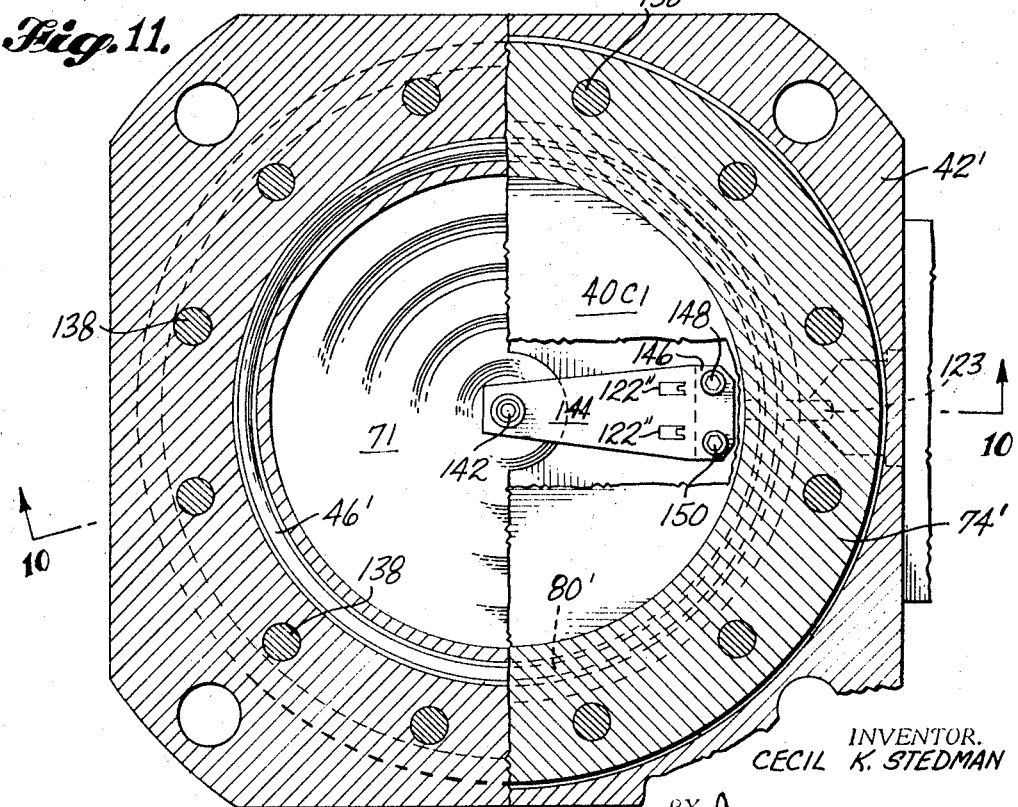
Figure 12:
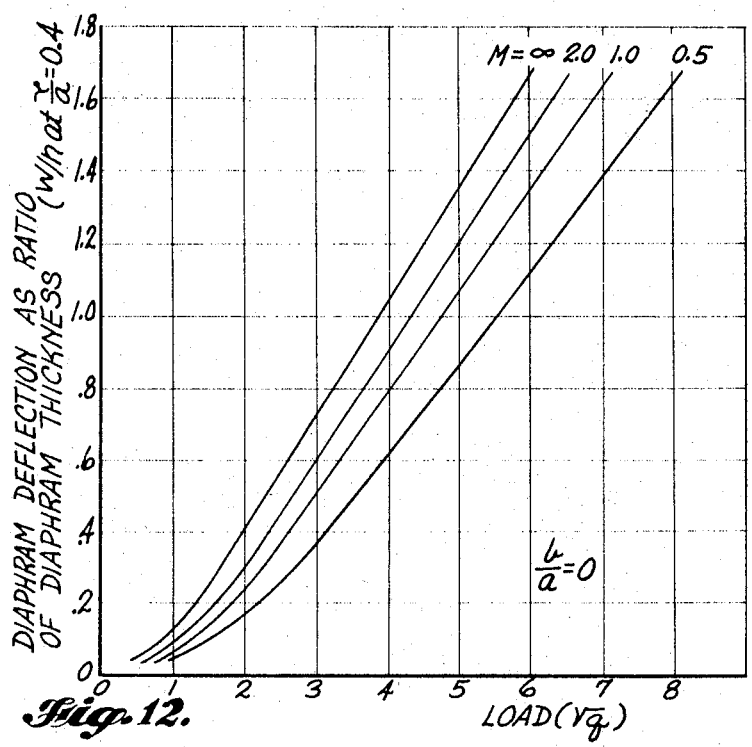
Figure 13:
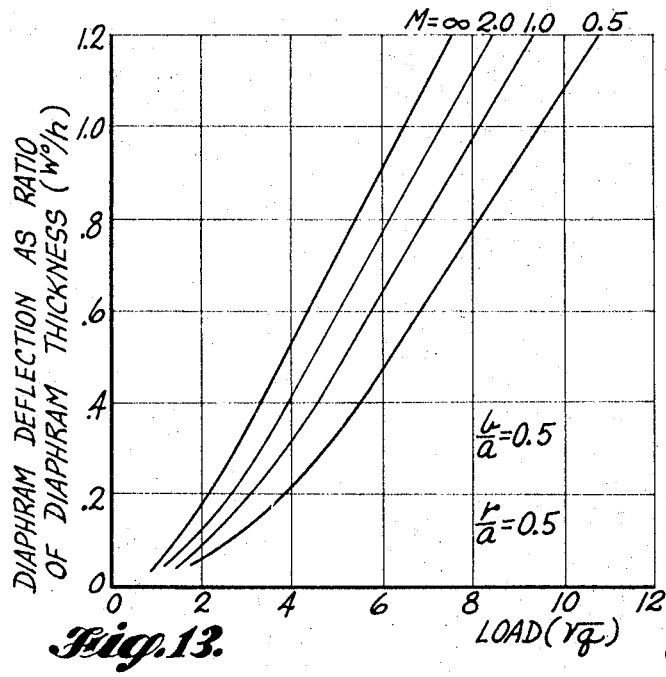
Figure 14:
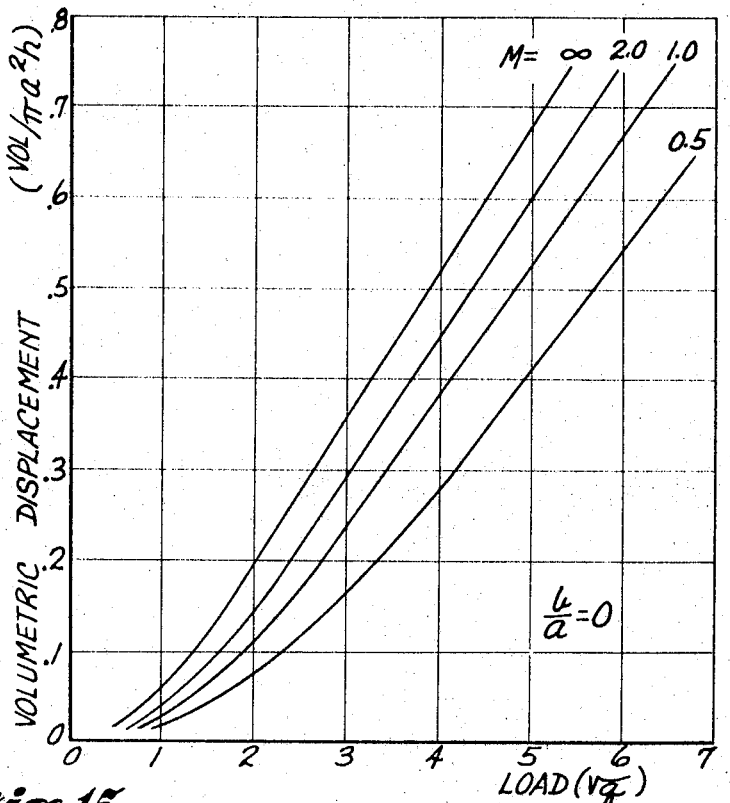
Figure 15:
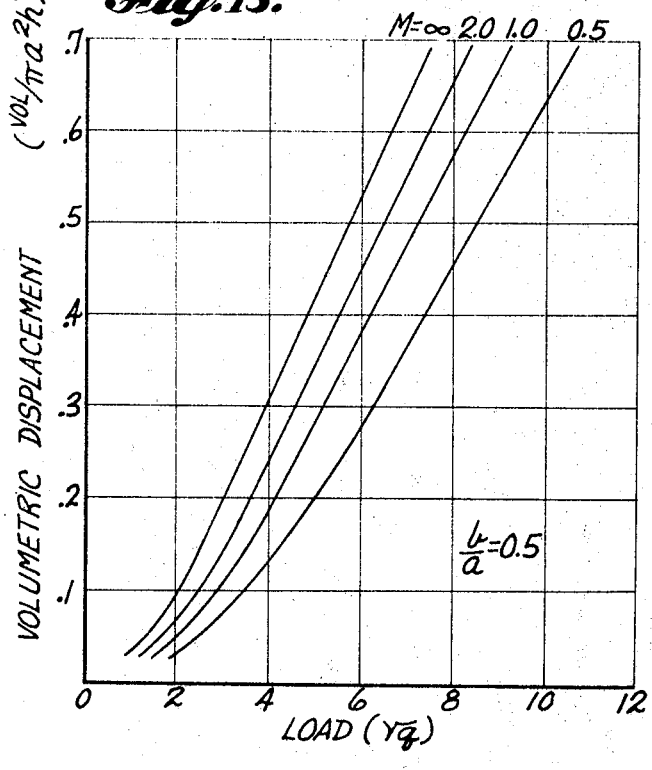

FIG. 9 is a fragmentary isometric view of a boss type load sensing diaphragm and associated body structure, showing a further modified form of transducer characteristic of the invention, the constructional form in this instance being like that shown in FIGS. 7 and 8 except that the diaphragm deflection responsive components comprise strain gage means mounted directly on the load sensing diaphragm, in lieu of a cantilever beam and associated linkage to the diaphragm;

FIG. 10 is a view in axial cross section of a further modified form of transducer assembly characteristic of the present invention, wherein two load sensing diaphragms are arranged to also serve as isolation diaphragm means and on deflection effect volumetric displacement of a relatively limber, centrally disposed diaphragm which is in turn mechanically linked to volumetric displacement responsive mechanism comprising a cantilever beam mounting a plurality of strain gage means;

FIG. 11 is a fragmentary view in cross section of the transducer assembly shown in FIG. 10, taken substantially along line 11—11 thereof;

FIG. 12 is a graphical presentation of the response characteristics of a flat, clamped diaphragm (with $b/a=0$) which is connected off-center (at $r/a=0.4$) to the deflection sensing beam means, as exemplified by the form of transducer assembly shown at FIGS. 2–6, the plot of FIG. 12 being that of the ratio of diaphragm deflection over diaphragm thickness vs. the square root of the load ($\sqrt{q}$), for values of M (volumetric displacement ratio) of 0.5, 1.0, 2.0, and $\infty$;

FIG. 13 is a graphical presentation similar to that of FIG. 12, showing the response characteristics of a boss type diaphragm (with $b/a=0.5$) with central connection (at $r/a=0.5$) to displacement sensing means, as exemplified by the transducer assemblies illustrated at FIGS. 7–9;

FIG. 14 is a graphical presentation like that of FIGS. 12 and 13, showing the response of a flat load sensing diaphragm means (with $b/a=0$), in terms of volumetric displacement in relation to load ($\sqrt{q}$) for values of M of 0.5, 1.0, 2.0 and $\infty$ as exemplified by the form of transducer assembly shown at FIGS. 10 and 11; and FIG. 15 is a graphical presentation like that of FIG. 14, showing load sensing diaphragm response in relation to load ($\sqrt{q}$), for a boss type clamped diaphragm ($b/a=0.5$).

In general, the specified description presented below deals first with a specific description of the mechanical components and arrangements illustrated in FIGS. 1 through 11, then presents a detailed treatment of certain design theory and related considerations pertaining to the invention, in conjunction with the graphical presentations set for in FIGS. 12–15.

Figure 1:
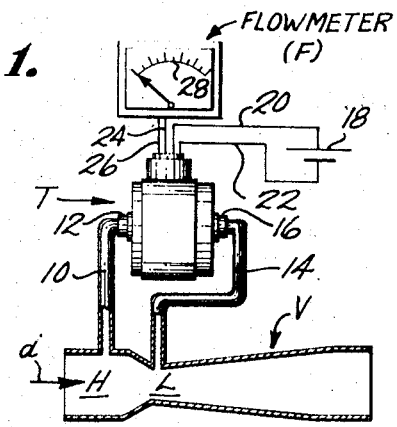
FIG. 1 is a somewhat schematic view of a venturi type fluid conduit in conjunction with a square root responsive transducer assembly, and associated Wheatstone bridge and linear scale indicator means or the like, operatively arranged in a manner provided by the present invention.

The somewhat diagrammatic showing of FIG. 1 illustrates typical utilization in a venturi meter assembly of a square root responsive transducer designed according to the present invention. To monitor the flow rate of a fluid through a venturi tube V wherein the fluid flow is in the direction indicated at $d$ and wherein the fluid has a characteristic relatively high pressure and relatively low velocity in region H and a relatively high velocity, relatively low pressure at the constricted throat region L, a square root responsive transducer T according to the present invention is connected to be in fluid flow communication between such high pressure region H and low pressure region L, such connection being typically by means of a branch conduit 10 leading from the high pressure region H to one inlet-outlet connection 12 of the transducer T, with a second branch conduit 14 leading from such low pressure region L to the other inlet-outlet 16 of the transducer T.

As more fully discussed below, the transducer T of FIG. 1 comprises suitable strain sensitive components responsively coupled to the load sensing diaphragm means and providing an output signal indicative of the extent of deflection or extent of volumetric displacement of the load sensing diaphragm means. Such strain sensitive components typically comprise an even plurality (usually four) strain gages connected in the usual Wheatstone bridge circuit and providing, from a fixed difference in electrical potential (as from battery 18 applied across input conductors 20, 22), a varying output potential (appearing across output conductors 24, 26) which is essentially linearly related to the extent of strain imposed on the gages by the load sensing diaphragm means. In the meter assembly shown in FIG. 1, since flow rate of the fluid through the venturi tube V is essentially proportional to the square of the pressure differenital existing between the fluid pressures in conduits 10 and 14, and since the extent of deflection or volumetric displacement of the load sensing diaphragm means of the transducer T is essentially proportional to the square root of the pressure differential (i.e. load), the potential difference appearing across the output conductors 24, 26 is essentially linearly proportional to the flow rate of the fluid in the venturi tube T.

The flow rate output signal appearing across output conductors 24, 26 is thus utilizable, either directly or after suitable linear signal amplification, by a suitable linear utilization means, such as a direct reading voltmeter (as desigted flowmeter F in FIG. 1), having a linear scale 28 linearly calibrated to provide a direct reading indication of fluid flow rate.

In the various forms of transducers illustrated at FIGS. 2–11, the relative dimensions and arrangements shown are drawn substantially to scale.

A typical square root responsive transducer assembly according to the present invention is shown at FIGS. 2–6, and generally designated T1. Flat, load sensing diaphragm 40A, fabricated from 17–7 stainless steel to a thickness of .008 inch and with exposed faces of a diameter of 2 inches, for example, is clamped between body members 42, 44, in the manner shown, with respective O-ring seals 46, 48 being provided peripherally of the diagram 40A. Body members 42, 44 are assembled together by circumferentially arranged bolts, certain of which are indicated at 50.

A stop boss 62 extends axially of the member 42 and, by means of threads 54, slot 56 and lock nut 58, is axially adjustable therein to mechanically limit the extent of upward deflection of the diaphragm 40A (as viewed in FIG. 2) and inhibit rupture thereof in the event of overload. Similarly, stop boss 60 extends axially of the body member 44 and is axially adjustable therein by means of threads 62, slot 64 and lock nut 66 to mechanically limit the extent of downward deflection (as viewed in FIG. 2).

Relatively limber isolation diaphragms 70, 72 suitably fabricated in a corrugated configuration as shown and formed of 304 stainless steel sheet of .002 inch thickness with an effective diameter of 2.6 inches, for example, are clamped to the respective body members 42, 44 by respective end caps 74, 76, with circumferentially arranged bolts retaining the end caps on the body members, certain of which bolts are indicated at 78, and with fluid seals being provided peripherally of the isolation diaphragms 70, 72, by respective O-rings 80, 82. Also provided in said respective end caps 74, 76 are respective threaded inlet-outlet conduit 12 and outlet-inlet conduit 16, to which the respective branch conduits 10, 14 from the associated pressure differential generating device (such as venturi tube V, FIG. 1) are connected.

Respective load transmitting pressure chambers, generally designated 84, 86, are filled with a suitable hydraulic fluid such as Dow Corning DC 200 silicone oil in a manner conventional per se. Said chambers 84, 86 are in part respectively defined by the facing surfaces of the load sensing diaphragm 40A and the isolation diaphragm 70, and by the facing surfaces of the load sensing diaphragm 40A and the isolation diaphragm 72, and are preferably designed to be of substantially equal volume so as to not introduce any substantial "zero shift" by reason of expansion or contraction of the hydraulic fluid contained in these chambers. As will be apparent in FIG. 2, for example, these respective chambers 84, 86 are further defined by the bounding surfaces of the respective body members 42, 44, including respective passageways 88, 90 and respective filler bores 92, 94 through which the hydraulic fluid is introduced, each of the bores 92, 94 being respectively provided with a threaded filler plug 96, 98.

Figure 3:
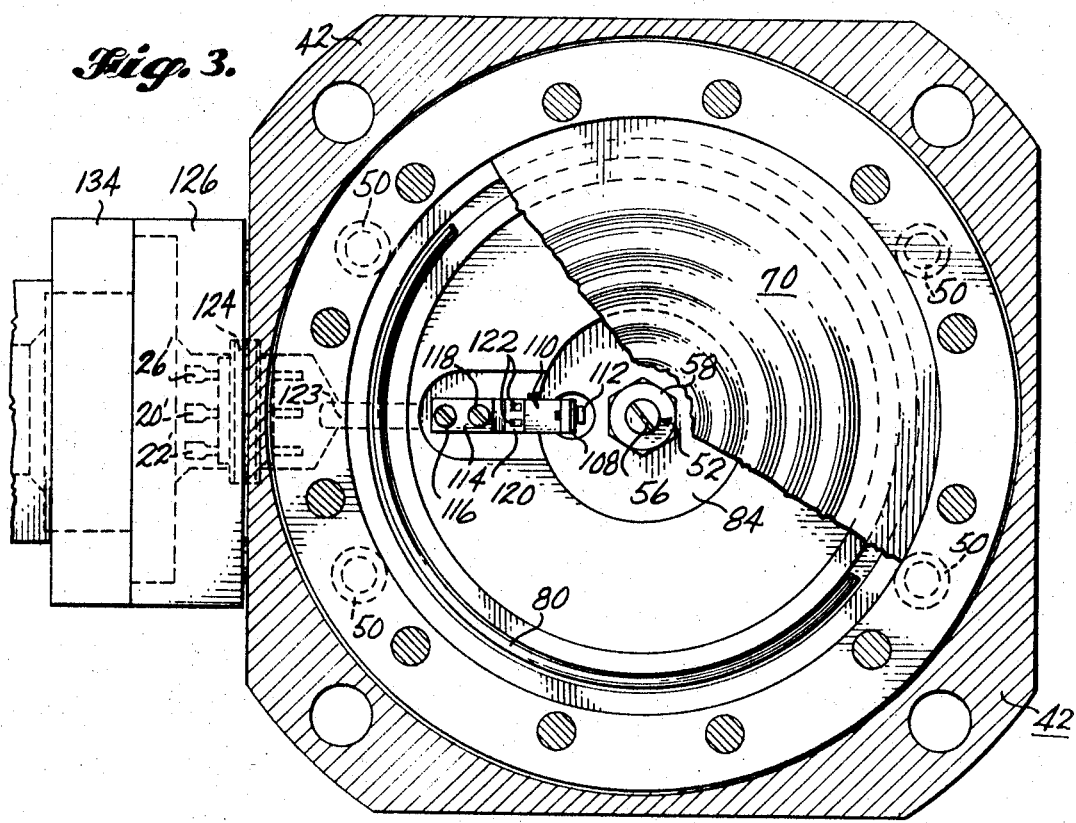
FIG. 3 is a cross-sectional view taken substantially along line 3—3 of FIG. 2.

In the form of transducer shown at FIGS. 2 through 6, the mechanical linkage, suitably in form of a rod generally indicated at 100, is connected off-center (at $r/a=0.4$) of the load sensing diaphragm 40A, by means of an internally threaded boss 102 (affixed as by weldment to the diaphragm 40A), with the lower end 104 of the rod 100 being threaded into the boss 102 and locked at a selected length by means of lock nut 106. The upper end 108 of the linkage rod 100, which is flattened to readily permit flexure, is connected to the movable end of a cantilever beam 110 by means of bolt 112, and the cantilever beam 110 is rigidly mounted on the body member 42 at the opposite end 114 thereof, as by bolts 116, 118. The central portion of the beam 110, as indicated at 120 is relatively thin so as to have a relatively limber flexural characteristic, and has bonded to the flexed surface or surfaces thereof a plurality of strain gages 122, suitably formed for example, of electro-etched foil or wire in the manner known per se in the art. As will be readily understood, while two such strain gages 122 are shown in FIGS. 3 and 6, for example, four such strain gages 122 can readily be employed with two gages on the upper surface of the thin central portion 120 of the beam 110, and two such gages similarly bonded to the opposite surface of said thin central portion 120.

The strain gages 122 are connected in a conventional Wheatstone bridge circuit, and the input and output electrical conductors of the bridge circuit (not shown except in FIG. 1) extend from the appropriate terminal tabs of the strain gages 122 through a channel 123 in the body member 42 and terminate in respective conductor pins 20', 22', 24', 26' extending through insulator header block 124. As will be noted in FIG. 2, for example, channel 123 and the inner surface of header block 124 form a part of the pressure chamber 84. Sealing the ceramic header 124 to the body member 42 is a retainer ring 126, the mounting being suitably by bolt means, one of which is indicated at 128, with respective O-ring seals 130, 132 being situated between the inner and outer flange surfaces of the header 124 and the adjacent surfaces of the body member 42 and retainer ring 126. A removable connector 134 and conductor casing (not shown) enclose the ends of the respective external conductors 20, 22, 24, 26 which respectively are connected to the pins 20', 22', 24', 26' and lead to the power supply and utilization circuitry, as shown in FIG. 1.

As will be apparent, the differential pressure load appearing between the outer surfaces of the isolation diaphragm 70, 72 is transmitted through the isolation diaphragm and through the hydraulic fluid in the chambers 84, 86 to effect a load responsive deflection of the load sensing diaphragm 40A, which diaphragm deflection in turn effects movement of the cantilever beam 110 through linkage rod 100, stressing the strain gages 122. The strain thus induced in the strain gages 122, through connection thereof in a Wheatstone bridge circuit, provides the desired output signal at conductors 24, 26.

The graphical presentation appearing at FIG. 12, and the associated discussion of certain design considerations applicable thereto, are particularly directed to the transducer assembly shown at FIGS. 2–6, and are discussed in a later portion of this description.

A modified form of transducer is shown at FIGS. 7 and 8, and designated generally at T2. Transducer T2 comprises many components which are either identical to or functionally like the corresponding components of transducer T1, and such corresponding components as are found in transducer T1 have either been omitted from FIGS. 7 and 8 for simplicity or have been designated in FIGS. 7 and 8 by identical numerals and need not be again discussed. The primary difference between the transducers T1 and T2 is that transducer T2 comprises a load sensing diaphragm 40B with a relatively thick central boss 41 (the radius of which is selected at one-half that of the effective radius of the diaphragm 40B, i.e. at $b/a=0.5$).

Certain theoretical considerations and operating characteristics relating to a clamped diaphragm with boss, such as load sensing diaphragm 40B, are more fully discussed in my aforesaid U.S. Patent No. 3,341,794.

A further difference between transducer T1 and transducer T2 is that in transducer T2 the linkage rod 100' extending between diaphragm mounted boss 102' and cantilever beam 110 is centrally disposed (i.e. at $$r/a=0.5$$

with respect to the diaphragm 40B and passes coaxially within the stop boss 52', which in this case is provided with a central bore 53 within which the linkage rod 100' can freely move.

The design considerations and operating characteristics of transducer T2 are discussed in more detail below in conjunction with the corresponding graphical presentation shown at FIG. 13.

FIG. 9 in fragmentary isometric view illustrates a further modified form of transducer T3, which is essentially identical to that shown at FIGS. 7 and 8 except that in this instance the strain gages 122' are mechanically linked to the load sensing diaphragm 40B by being bonded directly to the diaphragm 40B, which placement of the strain gages 122' eliminates the linkage rod 100' and cantilever beam 110 of the transducer T2. As will be readily understood, the electrical conductors (not shown) leading from the strain gages 112' are in this form of the invention led out from the pressure chamber 86 through an appropriate channel and header (like channel 123 and header 124) in the body member 44, as desired.

FIGS. 10 and 11 collectively illustrate yet a further typical embodiment of the present invention, the transducer assembly there shown being designated T4. In FIGS. 10 and 11, identical numerals designate identical parts and prime numerals designate parts not significantly different from earlier discussion assembly components. Transducer T4 varies from transducers T1–T3 in that it is designed to operate responsive to the extent of volumetric displacement of the hydraulic fluid within chambers 84, 86, rather than the extent of deflection of its load sensing diaphragm means 40C1, 40C2. As shown in FIGS. 10 and 11, the transducer T4 load sensing diaphragm means comprises the two flat diaphragm 40C1, 40C2, which are respectively clamped between body member 42' and end member 74', and between body member 44' and end member 76', and which also function as isolation diaphragm, segregating the load transmitting hydraulic fluid in respective pressure chambers 84', 86' from the pressure applying fluid. To sense hydraulic fluid displacement in the chambers 84', 86' a relatively limber displacement responsive diaphragm 71 is situated between the body members 42', 44'. Body members 42', 44', end caps 74', 76', seals 80, 80', 82, 82', and diaphragms 71, 40C1, 40C2 are assembled together as by bolts, certain of which are indicated at 128. Said diaphragm 71 is of the same effective diameter as the load sensing diaphragms 40C1, 40C2, and can be constructionally identical to the isolation diaphragms 70, 72 found in the earlier discussed forms of transducers. A small central boss 140, attached as by a weldment to the displacement sensing diaphragm 71, is mechanically linked through threaded rod 142 to cantilever beam 144, which in turn has one end 146 thereof rigidly attached to the body member 42', as by bolts 148, 150, A plurality of strain gages 122" are bonded to the beam 144, and are responsive to strain induced flexure in the beam 144.

From the foregoing consideration of typical transducers T1 and T4 according to the invention, as well as certain design considerations characteristic thereof as hereinafter discussed, various other forms thereof will readily occur to those skilled in the art to which the invention is addressed. For example, assuming a given load sensing diaphragm means has the essentially square root responsive characteristics, it will be apparent that in certain usages the isolation diaphragm means (such as 70, 72) can be dispensed with if the nature of the operating environment permits direct exposure of the load sensing diaphragm means to the load applying fluid. Also, placement of the strain gages in directly bonded relation to the load sensing diaphragm means (such as shown in FIG. 9) is equally appropriate with respect to a flat type clamped diaphragm (e.g. diaphragm 40A or diaphragm means 40C1, 40C2). It will be further evident that the operatively responsive relation between the load sensing diaphragm means and the output signal generating components can be effected by means other than mechanically linked strain gages (and that in many installations other forms may be preferable in terms of minimal or zero stiffness in the diaphragm movement sensing components). In this respect certain of the various alternative forms of diaphragm movement responsive mechanisms can involve utilization or capacitative, optical, or linear variable differential transformer (LVDT) components which are known per se for the purpose.

Attention is next given to a more detailed presentation of certain design considerations for providing transducers having the square root responsive operating characteristics necessary for practice of the present invention.

The following mathematical symbols are employed in the subsequent discussion of design considerations:

$E$—Young's modulus
$\mu$—Poisson's ratio
$a$—diaphragm radius
$h$—diaphragm thickness
$r$—radial distance from center of diaphragm
$w$—diaphragm deflection at any fractional radial distance $r/a$
$w_o$—diaphragm deflection at $r=o$
$b$—boss radius when appearing as $b/a$, otherwise beam width
$l$—beam length
$t$—beam thickness
$\gamma$—ratio of cantilever stiffness to sensing diaphragm stiffness
$S_{rB}$—peak radial stress in diaphragm, bending
$S_{rM}$—peak radial stress in diaphragm, membrane
$f$—coefficient in diaphragm stress equation; at $b/a=0$, $f=.75$; at $b/a=0.5$; $f=9.56$
$X_F$, $X_P$, $V_F$, $V_P$, $A_e$, $A_a$—diaphragm response coefficients (used with subscript $s$ for nonlinear sensing diaphragm, with subscript $i$ for isolation diaphragm)
$P$—operating range in terms of p.s.i.d.
$X$, $V$—diaphragm response to load $P$
$M = V_{pi} \div V_{ps}$—volumetric displacement ratio
$P$—pressure; subscripts $s$ for sensing, $i$ for isolation, $t$ for total
$q$, $q_s$, $q_i$, $q_t$—corresponding dimensionless load parameters To render the following design data readily applicable to diaphragms of any thickness and radius, they are expressed in terms of dimensionless quantities, deflection as $w/h$, stress as $$\frac{S}{E} \frac{a^2}{h^2}$$

volume as $V/\pi a^2 h$, and load as $$\frac{p}{E} \frac{a^4}{h^4}$$

For brevity the latter quantity will be represented by $$q = \frac{p}{E} \frac{a^4}{h^4} \quad (1)$$

Stress, deflection and volumetric displacement functions appear in FIGURES 12–15 as the curves marked $M=\infty$. The curves labelled with smaller values of M illustrate the effect of the stiffness of isolation diaphragms as explained below.

Use of isolation diaphragms, as often required, involves a pressure drop across the isolation diaphragm which is too large to ignore. For any given load sensing diaphragm the additional pressure requirement of the isolation diaphragms can be calculated from its volumetric displacement and the pressure-volume relationship of the isolation diaphragms. However a dimensionless representation is needed which makes apparent the entire range of input-output relationships that is obtainable with a particular form of flexure. This can be formulated as follows.

Designating the pressure drop across the sensing diaphragm as $P_s$ and across two isolation diaphragms (assumed to be identical and linear at all displacements) as $P_i$, then Volumetric displacement (for small displacements) =

$$V_{ps} \times ps = V_{pi} \times pi \quad (2)$$

Expressing the coefficient for the isolation diaphragms as a multiple M of the coefficient for the load sensing diaphragm, then $$V_{pi} = MV_{ps} \quad (3)$$

The quantity $V_{ps}$ for various $b/a$ is then seen to be:

TABLE 1

| $b/a$ | $V_{ps} \times \dfrac{Eh^3}{\pi a^6}$ |
|---|---|
| 0 | .05687 |
| .2 | .05031 |
| .5 | .02399 |
| .6 | .01491 |
| .7 | .007541 |
| .8 | .002654 |

Since the isolation diaphragms are assumed to be linear we can write, for any value of displacement, $$p_i = \frac{\text{Volumetric displacement}}{MV_{ps}} \quad (4)$$

Designating the total differential pressure by $P_t$, then $$p_t = p_s + p_i \quad (5)$$

and $$p_t = p_s + \frac{\text{Volumetric displacement}}{MV_{ps}} \quad (6)$$

Multiplying through by $a^4/Eh^4$, then $$\frac{p_t}{E}\frac{a^4}{h^4} = q_t = q_s + \frac{a^4}{Eh^4}\frac{\text{Volumetric displacement}}{MV_{ps}} \quad (7)$$

$$= q_s + \frac{1}{m}\frac{\text{Vol. displ.} \div \pi a^2 h}{V_{ps} \times \frac{Eh^3}{\pi a^6}} \quad (8)$$

$$\sqrt{q_t} = \left[q_s + \frac{1}{m}\frac{\text{Vol. displ.} \div \pi a^2 h}{V_{ps} \times \frac{Eh^3}{\pi a^6}}\right]^{1/2} \quad (9)$$

The effect of isolation diaphragms upon a curve plotted as a function of $\sqrt{q}$ is to increase each abscissa by some amount given by Equation 9. The amount of the increase is a complicated function of $q$, but is the same at a given $q$ regardless of what quantity we choose to plot as ordinates. It is thus not necessary to use Equation 9 unless a configuration not specifically here presented is desired, because curves are shown for several values of M in FIGURES 12–15 and the effect of other M values can be judged well enough by interpolation.

The effect of a relatively stiff linear isolation diaphragm means upon the shape of the response curves in the useful ranges is remarkably small. There is a tendency for the curves to bend upwardly as shown most clearly in FIG. 12 The most conspicuous effect is that, for a given ratio of $\sqrt{q_t}$ max. to $\sqrt{q_t}$ min., $\sqrt{q_t}$ max. is substantially increased, with corresponding increase in the stress and increase in $a/h$ for an instrument of a given range, as will be seen from the design equations below.

The effect of boss diameter in the load sensing diaphragm upon the requirements for the isolation diaphragms is a matter of interest. It is found that for an instrument of a given range and diameter the volumetric displacement response with $b/a = 0.5$ is little different from that with $b/a = 0$. The diaphragm deflection is smaller for a diaphragm with boss, but this is compensated by its larger effective area. It is, however, easier to achieve large M values with the boss as can be seen from the numbers in Table 1.

Assuming one of the response curves shown in FIGS. 12–15 has been selected, it will be seen that the smaller the value of $\sqrt{q_t}$ max., the lower the stress and the smaller the value of $a/h$ so, on the selected curve, the designer can choose the smallest values of $\sqrt{q_t}$ max. and $\sqrt{q_t}$ min. that meet the linearity specifications. Then, if P is the range, it follows from Equation 1 that $$\frac{P}{E}\frac{a^4}{h^4} = q_t \text{ max.} \quad (10)$$

In order to cover the possibility of diaphragms with various boss sizes, or no boss at all, the peak bending stress in the load sensing diaphragm can be written $$S_{rB} = f_{ps\ \text{max.}} \frac{a^2}{h^2} \quad (11)$$

or, using Equation 1, $$S_{rB} = f_{qs\ \text{max.}} E \frac{h^2}{a^2} \quad (12)$$

with $f$ values obtainable as follows:

Table 2

| $b/a$: | $f$ |
|---|---|
| 0 | .750 |
| .5 | .563 |
| .6 | .480 |
| .7 | .383 |
| .8 | .270 |

Equation 12, above, is equally applicable to boss type diaphragms whether they be designed to be linearly responsive (as in my aforesaid U.S. Patent No. 3,341,794), or whether they are square root responsive according to the present invention. Either response mode will involve a design value for $S_{rB}$ which is the same, assuming use of the same diaphragm material, but the square root responsive instrument, being designed for a higher $q$, will of course have a smaller $h/a$ ratio.

The value of $\sqrt{q_s}$ max. is readily determined by entering the applicable family of curves at $\sqrt{q_t}$ max., reading $w/h$ from the selected curve, and reading $\sqrt{q_s}$ max. at the same $w/h$ from the $M = \infty$ curve. Elimination of $a/h$ between Eqs. 10 and 12 gives $$P = \frac{S_{rB}^2}{f^2 E}\frac{q_t\ \text{max.}}{(q_s\ \text{max.})^2} \quad (13)$$

The value of $a/h$ for any desired range is given by Eq. 10 which can be written $$\frac{a}{h} = \left(\frac{E q_t\ \text{max.}}{P}\right)^{1/4} \quad (14)$$

The $q$ values are controlled by the specifications of the instrument so Eq. 13 indicates, that generally speaking, the range is proportional to the square of the stress, and the maximum practical range is limited by the maximum permissible stress. The precise effect of changing $b/a$ or M cannot be seen at a glance, because several factors in Eq. 13 are changing. But several illustrative individual cases are as follows:

TABLE 3

| Figure | $b/a$ | $r/a$ | M | $\sqrt{q_t}$ max. | $\sqrt{q_s}$ max. | $P_{p.s.i.}$ | $a/h$ | Relative max. vol. displ. for $a=1$ |
|---|---|---|---|---|---|---|---|---|
| 5 | 0 | .4 | 2.0 | 4.5 | 3.95 | 12.32 | 84 | 133 |
| 5 | 0 | .4 | 1.0 | 6.0 | 4.9 | 9.25 | 104 | 216 |
| 7 | .5 | .5 | 2.0 | 8.1 | 7.1 | 6.79 | 131 | 273 |
| 11 | .7 | .7 | 3.34 | 14 | 12.8 | 4.15 | 194 | 443 |

In each case the smallest $q$ values were chosen, subject to the conditions that the curve fitted the best straight line with $\pm 1\%$, and $\sqrt{q_t}$ max. $\div \sqrt{q_t}$ min. $= 3.0$. Stress in the sensing diaphragm was taken to be $S_{rB} = 50,000$ p.s.i.

It would be expected that stiffening the isolation diaphragms, while stress on the sensing diaphragms was held constant, would increase the range of the instrument because of increased pressure drop across the isolation diaphragms.

Actually, as shown by the first two entries in Table 3, the reverse happens because the increased curvature forces an increase in $\sqrt{q_s}$ max. The first entry does not, of course, represent the highest range instrument that can be built with a clamped diaphragm as the square root responsive element. Higher range is obtainable by increasing M, decreasing the ratio $\sqrt{q_t}$ max. $\div \sqrt{q_t}$ min., or by increasing the stress. An arrangement involving two load sensing diaphragms, as in FIGS. 10 and 11 for example, can be used to substantially double the response range.

The lower limit of practical ranges will be determined by the upper practical limit for $a/h$, Eq. 14. Here the only requirement is to make $q_t$ max. as small as possible. The lowest possible value for $q_t$ min. on any of the curves presented at FIGS. 12–15 is about 1.0. Then, with a linear range of 2:1 $q_t$ max.=4, and $a/h \approx 105/P^{1/4}$ and with $P=1$ p.s.i., $a/h=105$.

Figure 5:
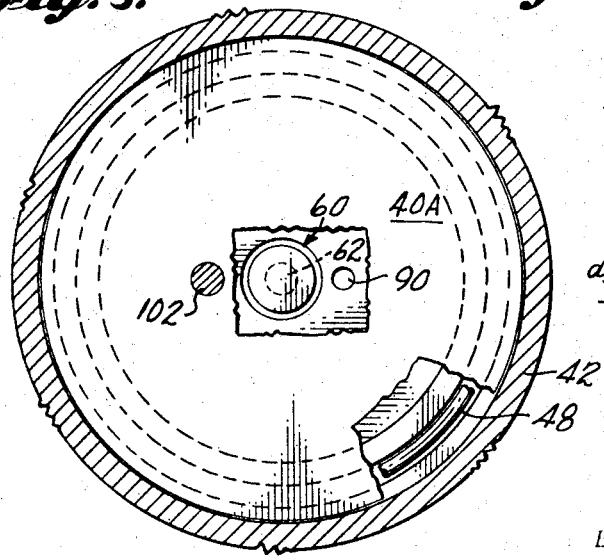
FIG. 5 is a fragmentary cross-sectional view, with portions broken away, taken substantially along line 5—5 of FIG. 2.

To illustrate the problems involved in design of a cantilever beam to measure deflections, take the case in FIG. 5 of $b/a=0$, $r/a=0.4$, $M=2$, $\sqrt{q_t}$ max.=4.5, and $w/h$ max.=1.04. Regardless of range it is necessary to design for the stated $\sqrt{q_t}$ max. so Eq. 14 becomes $$a/h = 157/P^{1/4} \tag{15}$$

We impose the condition that the cantilever stiffness is some fraction $\gamma$ of the diaphragm stiffness. A suitable value for $\gamma$ can be determined by experience.

$$\text{Cantilever stiffness} = \frac{1}{4} E_b \frac{t^3}{s^3} \tag{16}$$

$$\text{Diaphragm stiffness} = \frac{4\pi}{3} \frac{E}{1-\mu^2} \frac{h^3}{a^2} \tag{17}$$

So $$\frac{t^3}{s^3} = \frac{4}{E_b} \gamma \frac{4\pi}{3} \frac{E}{1-\mu^2} \frac{1}{a^2} \left( \frac{aP^{1/4}}{157} \right)^3$$

and $$\frac{t}{s} = 0.01682 \left( \frac{\gamma}{b} \right)^{1/3} a^{1/3} P^{1/4} \tag{18}$$

Maximum stress in the cantilever beam is $3\omega Et/2s^2$ and $\omega = 1.04h$ so, substituting $t/s$ from Eq. 18, we get $$\text{Stress} = 5000 \frac{1}{s} \left( \frac{\gamma}{b} \right)^{1/3} a^{4/3} P^{1/2} \tag{19}$$

If the cantilever beam is designed for a stress of 50,000 p.s.i., $$sb^{1/3} = 0.1\gamma^{1/3} a^{4/3} P^{1/2} \tag{20}$$

and $$tb^{2/3} = 0.00168 \gamma^{2/3} a^{5/3} P^{3/4} \tag{21}$$

Volumetric displacement is not directly related to central deflection, as a measure of load sensing diaphragm movement. Volumetric displacements at various $M$ values are plotted against $\sqrt{q}$ in FIGS. 14 and 15.

In determining the usable response range of a given instrument, the curved, lower portion of the response curves in FIGS. 12–15 are to be excluded from the usable range. Thus, for example, the linear scale 28 of flowmeter F of FIG. 1 is to be read from a finite value (e.g. a flow rate) corresponding to the minimum loading at which the corresponding response curve (as in FIGS. 12–15) is straight.

From the foregoing, various other modifications and adaptations of the principles of the invention will readily occur to those skilled in the art to which the invention is addressed within the scope of the following claims.

What is claimed is:

1. A square root responsive pressure transducer, comprising:
  (a) load sensing diaphragm means;
  (b) means clamping the edge of said diaphragm means and defining a fluid pressure chamber at each face thereof, said diaphragm means being characterized by load induced response within the limit of elasticity of the diaphragm material throughout a loading range extending to a $q$ value of at least about 30, where $$q = \frac{p}{E} \frac{a^4}{h^4}$$

and $p$ is the pressure differential across the diaphragm,
  $E$ is Young's modulus of elasticity of the diaphragm material,
  $a$ is the radius of the diaphragm means, and
  $h$ is the thickness of the diaphragm means;

and where the load induced response of said diaphragm means is approximately linear with respect to $\sqrt{q}$ over a range of $q$ values from less than about 3 to at least about 30.

2. A square root responsive pressure transducer according to claim 1, wherein said diaphragm means comprises a diaphragm with a relatively thick central boss and a relatively thin annular portion surrounding said boss, and is characterized by load induced response within the limit of elasticity of the diaphragm material throughout a loading range extending to a $q$ value of at least about 75.

3. A square root responsive pressure transducer according to claim 1, wherein said diaphragm means is of uniform thickness throughout.

4. A square root responsive pressure transducer according to claim 1, comprising relatively compliant isolation diaphragm means in series flow relation with said load sensing diaphragm means.

5. A square root responsive pressure transducer according to claim 4, wherein said transducer has a volumetric displacement ratio M defined by the relationship $M = V_{pi}/V_{ps}$ where $V_{pi}$ is the volumetric displacement of the isolation diaphragm means under a given pressure loading, and
  $V_{ps}$ is the volumetric displacement of the load sensing diaphragm means under said given pressure loading;

and $M \geq 2$.

6. In combination with a hydraulic fluid flow passageway having a relatively restricted section across which a differential pressure is developed substantially in proportion to the square of the velocity of the fluid flow through said section; a differential pressure transducer according to claim 1, with fluid connection means connecting respective inlet and outlet portions of said restricted section in fluid pressure transmitting relation to respective sides of said load sensing diaphragm means; and movement sensing means operatively related to said diaphragm means and developing therefrom an output signal which changes substantially in linear proportion to the rate of fluid flow through said restricted section.

7. The combination of claim 6, wherein said movement sensing means comprises a cantilevered beam, means mechanically connecting said beam to said load sensing diaphragm means, and strain sensitive bridge means mounted on said beam.

8. The combination of claim 7, wherein said beam is mechanically connected substantially to the center of said load sensing diaphragm means.

9. The combination of claim 7, wherein said beam is mechanically connected to said load sensing diaphragm means off-center of the diaphragm means.

10. The combination of claim 7, comprising means for adjusting the mechanical connection between said beam and said load sensing diaphragm means, for varying the static loading thereof.

11. A pressure transducer according to claim 4, wherein a load sensing diaphragm is disposed between two isolating diaphragms in relation to the direction of fluid flow.

12. A pressure transducer according to claim 1, wherein the said load induced response is related to the extent of depletion of said load sensing diaphragms means.

13. A pressure transducer according to claim 1, wherein the said load induced response is related to the extent of volumetric displacement of said sensing diaphragm means.

14. A pressure transducer according to claim 13, comprising two load sensing diaphragms with a relatively compliant linearly responsive diaphragm therebetween, in relation to the direction of fluid flow, and further comprising movement sensing means coupled to said linearly responsive diaphragm and developing therefrom an output signal responsive to the extent of volumetric displacement of said load sensing diaphragms.

15. The combination of claim 6, further comprising linearly calibrated indicator means responsive to said output signal and providing a direct reading indication of fluid flow rate through said restricted section.

References Cited

UNITED STATES PATENTS

| | | |
|---|---|---|
| 2,539,892 | 1/1951 | Cook. |
| 3,161,061 | 12/1964 | Ames. |
| 3,269,184 | 8/1966 | O'Connor _____ 338—4 X |
| 3,290,945 | 12/1966 | Li et al. _____ 73—407 |
| 3,300,745 | 1/1967 | Walter _____ 338—4 |
| 3,325,761 | 6/1967 | McLellan _____ 338—4 |
| 3,335,381 | 8/1967 | Giovanni _____ 338—42 X |

JAMES J. GILL, *Primary Examiner.*

EDWARD D. GILHOOLY, *Assistant Examiner.*

U.S. Cl. X.R.

73—398, 407; 338—4